United States Patent
Gu et al.

(10) Patent No.: US 10,140,336 B1
(45) Date of Patent: *Nov. 27, 2018

(54) ACCURACY TESTING OF QUERY OPTIMIZERS

(71) Applicant: Pivotal Software, Inc., Palo Alto, CA (US)

(72) Inventors: Zhongxian Gu, Davis, CA (US); Mohamed F. Soliman, San Mateo, CA (US); Florian Michael Waas, San Francisco, CA (US)

(73) Assignee: Pivotal Software, Inc., San Francisco, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 15/041,850

(22) Filed: Feb. 11, 2016

Related U.S. Application Data (63) Continuation of application No. 13/529,544, filed on Jun. 21, 2012, now Pat. No. 9,262,477.

(51) Int. Cl.
*G06F 7/00* (2006.01)
*G06F 17/00* (2006.01)
*G06F 17/30* (2006.01)

(52) U.S. Cl.
CPC .... *G06F 17/30469* (2013.01); *G06F 17/3053* (2013.01); *G06F 17/30371* (2013.01); *G06F 17/30598* (2013.01)

(58) Field of Classification Search
CPC ......... G06F 17/30463; G06F 17/30469; G06F 17/30471; G06F 17/30442; G06F 17/30598; G06F 17/30247
See application file for complete search history.

(56) References Cited

U.S. PATENT DOCUMENTS

| | | | |
|---|---|---|---|
| 6,947,927 B2 | 9/2005 | Chaudhuri et al. | |
| 7,363,289 B2 | 4/2008 | Chaudhuri et al. | |
| 7,716,210 B2 | 5/2010 | Ozcan et al. | |
| 7,936,872 B2 | 5/2011 | Krumm et al. | |
| 8,285,711 B2 | 10/2012 | Bordawekar et al. | |
| 8,290,930 B2 | 10/2012 | Ostrovsky et al. | |
| 8,335,767 B2 | 12/2012 | Das et al. | |
| 8,543,521 B2 * | 9/2013 | Yang | G06F 17/30274 706/12 |
| 8,949,253 B1 * | 2/2015 | Jing | G06F 17/3028 707/723 |
| 9,262,477 B1 | 2/2016 | Gu et al. | |
| 2002/0103695 A1 | 8/2002 | Urken et al. | |

(Continued)

OTHER PUBLICATIONS

Chaudhuri et al., "Rule Profiling for Query Optimizers and their implications," Data Engineering (ICED), 2010 IEEE 26th International Conference, Mar. 1-6, 2010.

(Continued)

*Primary Examiner* — Susan Chen
(74) *Attorney, Agent, or Firm* — Fish & Richardson P.C.

(57) ABSTRACT

Query optimizer accuracy is tested by measuring the actual execution times on a database of each of a plurality of alternative query plans for each of a plurality of queries, first ranking the plans by the actual execution times, then ranking the plans by estimated execution times, and correlating the two rankings by computing a rank correlation metric. The rank correlation metric is normalized so that different optimizers can be objectively compared.

20 Claims, 4 Drawing Sheets

(56) References Cited

U.S. PATENT DOCUMENTS

| | | | | |
|---|---|---|---|---|
| 2002/0198867 | A1* | 12/2002 | Lohman | G06F 17/30864 |
| 2003/0037074 | A1* | 2/2003 | Dwork | G06F 17/30864 |
| | | | | 715/229 |
| 2006/0200315 | A1 | 9/2006 | Zhou et al. | |
| 2007/0006177 | A1* | 1/2007 | Aiber | G06Q 10/10 |
| | | | | 717/136 |
| 2007/0250522 | A1* | 10/2007 | Perrizo | G06K 9/6282 |
| 2008/0010226 | A1* | 1/2008 | Brinker | G06K 9/6284 |
| | | | | 706/12 |
| 2008/0010240 | A1* | 1/2008 | Zait | G06F 17/30463 |
| 2009/0132895 | A1* | 5/2009 | Jiang | G06F 11/1072 |
| | | | | 714/781 |
| 2009/0319518 | A1 | 12/2009 | Koudas et al. | |
| 2010/0004769 | A1* | 1/2010 | Holden | G06F 17/5086 |
| | | | | 700/97 |
| 2010/0082602 | A1* | 4/2010 | Ganapathi | G06F 17/30469 |
| | | | | 707/718 |
| 2011/0271146 | A1* | 11/2011 | Mork | G06F 21/55 |
| | | | | 714/37 |
| 2014/0143407 | A1* | 5/2014 | Zhang | H04L 41/145 |
| | | | | 709/224 |

OTHER PUBLICATIONS

Dagstuhl, "The Mixed Workload Ch-benCHmark", In Proc. DBTest, Jun. 2011.

Giakoumakis et al., "Testing SQL Server's Query Optimizer: Challenges, Techniques and Experiences", IEEE Data Eng. Bulletin, 31(1), 2008.

Gu et al., "Testing the Accuracy of Query Optimizers", In Proc. DBTest 2012 Proceedings of the Fifth International Workshop on Testing Database Systems, May 21, 2012.

Harish et al., "Identifying Robust Plans Through Plan Diagram Reduction," In Proc. Proceedings of the VLDB Endowment, Aug. 2008.

Haritsa, "The Picasso Database Query Optimizer Visualizer", In Proc. Proceedings of the VLDB Endowment, Sep. 2010.

Kendall, "A New Measure of Rank Correlation", Biometrika, vol. 30, Part 1 of 2, Jun. 30, 1938, pp. 81-93.

Mackert et al., "R* Optimizer Validation and Performance Evaluation for Local Queries", In Proc, SIGMOD '86 Proceedings of the 1986 ACM SIGMOD International Conference on Management of Data, 1986.

Mackert et al., "R* Optimizer Validation and Performance Evaluation for Local Queries", Newsletter, ACM SIGMOD Record, Jun. 1986.

Stillger et al., "Testing the Quality of a Query Optimizer", IEEE Data Engineering Bulletin, 1995.

Waas et al., "Counting, Enumerating, and Sampling of Execution Plans in a Cost-Based Query Optimizer", In Proc. ACM SIGMOD, 2000.

Waas et al., Plan Space Analysis: An Early Warning System to Detect Plan Regressions in Cost-Based Optimizers, In Proc. DBTest, Jun. 2011.

* cited by examiner

ACCURACY TESTING OF QUERY OPTIMIZERS

BACKGROUND

This invention relates generally to database query optimization, and more particularly to measuring the accuracy of query optimizers.

The accuracy of a query optimizer is intricately connected with the system performance of a database and its operational cost. One of the most performance-critical elements determining the accuracy of a cost-based optimizer is the accuracy of its cost model which determines how prone the optimizer is to misestimates, and, thus, to bad plan choices. And the optimizer is one of the most performance-sensitive components in a database as differences in query plans may result in several orders of magnitude of difference in query performance, significantly more than any other contributing factor. The more accurate the optimizer, the better and less costly the resulting query execution plans.

Database application programmers and other practitioners have long provided anecdotal evidence that database systems differ widely with respect to the quality of their optimizers. But, comparing query optimizers objectively is a difficult undertaking. Benchmarks, e.g., TPC-H, have been developed for assessing the query performance of database systems as a whole, end-to-end. However, no framework has been available to assess accurately the performance of the query optimizer in isolation or to permit objective comparison of the optimizers of different database systems.

There is no standard way to test an optimizer's accuracy. The cost units used in the cost model displayed with a plan do not reflect real time, but are used only for comparison of alternative plans pertaining to the same input query. Comparing these estimated cost values (times) with the actual execution times does not permit objective conclusions about the accuracy of the cost model. Moreover, the optimization results are highly system-specific and therefore defy the standard testing approach where results are compared to a reference or baseline to determine if the optimizer finds the "correct" solution. The optimal query plan for one system may differ significantly from that for another system because of implementation differences in the query executors and the query optimizers. These differences can lead to choosing radically different plans.

The ability to measure and compare objectively and independently the accuracy of optimizers across different database systems is highly desirable. Typically, systems with more accurate optimizers outperform other systems, and this effect is often magnified substantially by complex analytics queries. An optimizer's inaccuracy usually leads to heightened efforts to improve system performance which contributes significantly to the total cost of ownership of the system. Moreover, during system development or upgrade, the ability to measure optimizer accuracy can guide the development process and may prevent regressions.

There is a need for a framework for testing and quantifying the accuracy of a database query optimizer for a given workload, as well as for enabling objective comparison of the accuracy of different optimizers with respect to their plan choices.

The invention is directed to these ends, and provides such a framework.

DESCRIPTION OF PREFERRED EMBODIMENTS

The invention is particularly well adapted for measuring and quantifying the performance of query optimizers of database systems, and will be described in that context. As will be appreciated, however, this is illustrative of only one utility of the invention.

Figure 1:
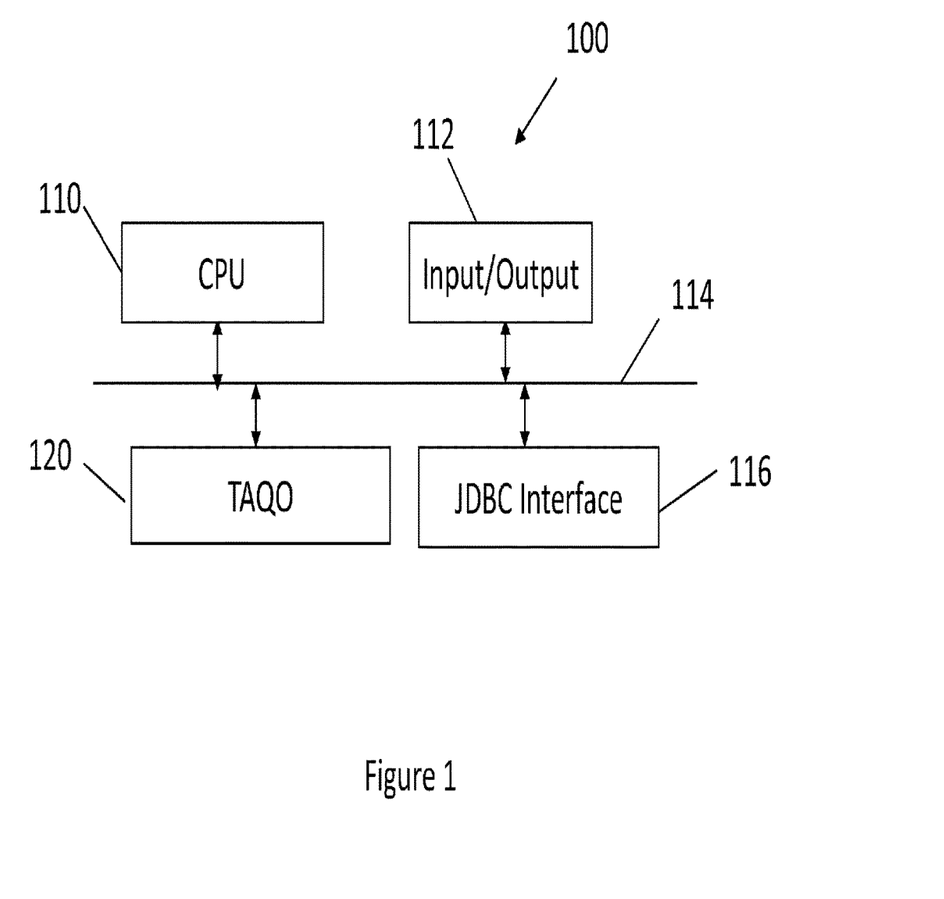
FIG. 1 is a block diagram of a stand-alone test and measurement system in accordance with the invention for testing and measuring the accuracy of query optimizers of database systems.

FIG. 1 illustrates the architecture of a stand-alone testing system 100 in accordance with the invention for objectively testing and measuring the accuracy of query optimizers in a manner that permits meaningful comparison of different optimizers. System 100 may have a standard computer system architecture comprising a central processing unit (CPU) 110 and input/output devices 112 connected to a communications bus 114. The testing system may also have a JDBC driver/interface 116 connected to bus 114 to allow the system to interface with any database having a standard JDBC interface. System 100 may additionally have memory 120 connected to bus 114 comprising computer readable storage media for storing executable program instructions for controlling CPU 110 to operate in accordance with the invention to provide a query optimizer accuracy tester (referred to herein as a "TAQO") for testing the accuracy of a query optimizer connected to the JDBC interface.

As will be described in more detail, the TAQO framework of the invention enables comparison of the accuracy of different optimizers with regards to their plan choices for a selected set of queries based upon the estimated costs they assign to all or to a sample of the plan alternatives they consider. For an optimizer being tested, the TAQO framework forces the generation of multiple alternative plans for each of the plurality of test queries, measures the actual execution times of the alternative plans, and ranks the plans by their effective costs. Optimizers expose switches (also referred to as "knobs" or "hints") that allow users to influence a plan choice and generate plans other than a default plan. For example, nearly all commercial database systems allow users to enable or disable certain features such as particular join implementations, for instance hash joins, or sort-based aggregation techniques. It is desirable to test optimizers using a plurality of alternative plans for a given query, and the invention uses these switches to force the generation of multiple alternative plans for a query. For assessing accuracy, the actual nature of the switches does not matter so long as they can be used to generate different the plans. The invention compares the ranking of plans based upon their actual execution costs to their ranking based upon their estimated costs generated by the optimizer, and computes a correlation metric between the two rankings to produce an accuracy score for each query of the test workload that reflects the likelihood of an optimizer making bad optimization decisions.

As used herein, accuracy refers to the ability of an optimizer's cost model to order any two given plans correctly based upon estimated execution costs. For a query Q, if $p_i$ and $p_j$ are two plans in the search space considered when optimizing Q, and $p_i$ has an estimated cost denoted by $e_i$, and an actual execution cost denoted by $a_i$, the optimizer is declared to be perfectly accurate if:

$$\forall i,j: e_i \le e_j \leftrightarrow a_i \le a_j$$

Figure 2:
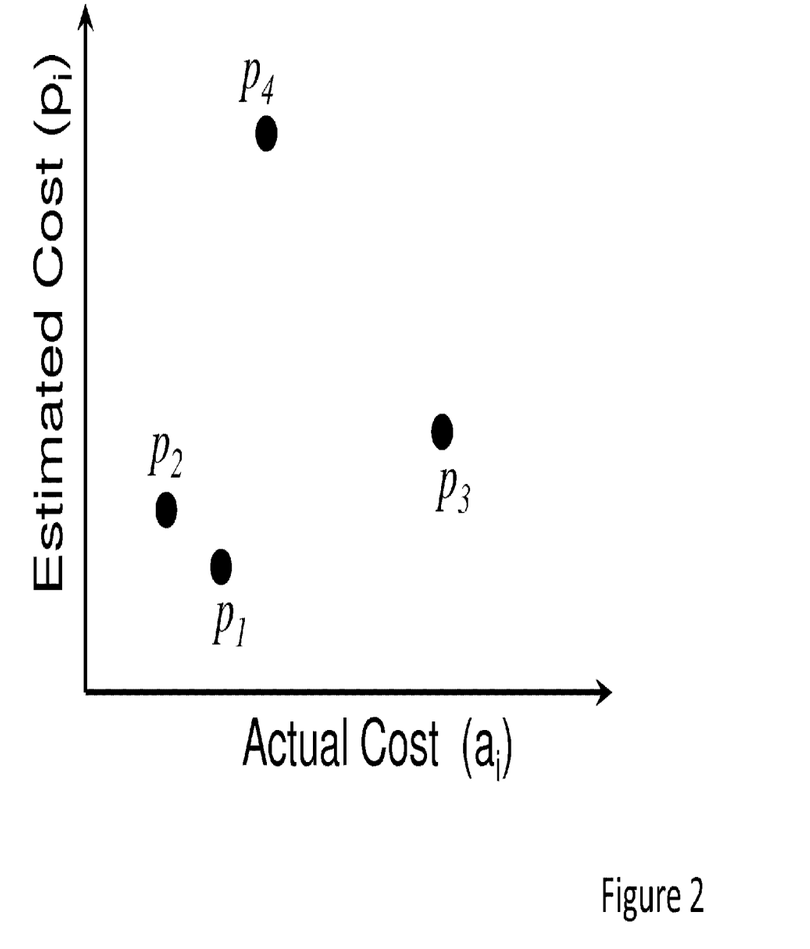
FIG. 2 is a scatter plot illustrating relative costs of alternative query plans.

That is to say, if for all plans $p_i$ and $p_j$, the estimated cost of plan $p_i$ is less than or equal to the estimated cost of plan $p_j$, and the actual cost of plan $p_i$ is less than or equal to the actual cost of plan $p_j$, the optimizer is deemed to be perfectly accurate. It is impractical to apply this concept to all possible plans an optimizer considers when optimizing a given query. Therefore, it is desirable to sample plans uniformly from the search space, although accuracy measures must also hold for a biased sample, which is true for the invention. The optimizer switches are used for forcing generation of multiple alternative plans, as described above, to produce an appropriate sample. FIG. 2 is a scatter plot which depicts four plans $p_1$-$p_4$ produced by an optimizer in the sample plan space of a query. A plan $p_i$ is represented as a point $(a_i, e_i)$ on the scatter plot, where $a_i$ and $e_i$ are the actual cost and the estimated cost, respectively, of plan $p_i$. As indicated in the figure, the optimizer is not perfectly accurate, as the plan pair $p_1$-$p_2$ and plan pair $p_3$-$p_4$ do not satisfy the above relationship, although pairs $p_1$-$p_4$ and $p_2$-$p_3$ satisfy it.

As will be explained in more detail below, in accordance with the invention, for a given query and a sample of plans from the overall plan space, a rank correlation metric is determined between the rankings of plans based upon estimated costs and the rankings based upon actual costs. In a preferred embodiment, the metric has certain pre-selected characteristics. It penalizes discordant pairs of plans, i.e., pairs whose ordering according to estimated cost does not reflect the ordering according to actual execution cost; it penalizes ranking errors involving important plans that are close to an optimal plan more so than insignificant plans; and it considers the pair-wise distance between plans by not weighting a ranking mistake for two plans with close actual execution costs the same as if they were two distant points. For example, in FIG. 2, incorrectly ranking plan pair $(p_1, p_2)$ is less significant than incorrectly ranking pair $(p_3, p_4)$. The rank correlation metric indicates how likely a given optimizer is to make bad optimization decisions. A preferred rank correlation metric is based upon the Kendall Tau rank correlation.

Assuming actual execution costs $a_1 \le a_2 \le \ldots \le a_m$ for a set of plans $S_Q = \{p_1, \ldots, p_n\}$, the Kendall Tau rank correlation $\tau$ is defines as:

$$\tau = \Sigma_{i<j} sgn(e_j - e_i)$$

To penalize incorrect ranking of bad plans over good plans, plans are weighted as:

$$w_m = \frac{a_1}{a_m}$$

which assigns an optimal plan in $S_Q$ with the best actual execution time a weight of 1. Plans with greater actual costs have lower weights. Additionally, to take into account distance, the pair-wise distance $d_{ij}$ between two plans $p_i$ and $p_j$ is the normalized Euclidean distance:

$$d_{ij} = \sqrt{\left(\frac{a_j - a_i}{a_n - a_1}\right)^2 + \left(\frac{e_j - e_i}{\max_k(e_k) - \min_k(e_k)}\right)^2}$$

Thus, the modified Kendall Tau rank correlation used by the invention produces an accuracy measurement determined by a correlation score, s, as $$s = \Sigma_{i<j} w_i \cdot w_j \cdot d_{ij} \cdot sgn(e_j - e_i)$$

This modified Kendall Tau rank correlation metric has the desired characteristics described above. The lower the value of the metric, s, the higher is the accuracy of the optimizer.

The above modifications to the Kendall Tau correlation afford portability by normalizing both plan weight and pair-wise distance to allow direct comparison of the accuracy between different optimizers. However, a factor not taken into account is the actual number of plans an optimizer considers. Since the overall correlation score depends on the size of the sample, the same sample size is used for every system. The number of plans accessible from an optimizer for a given query is not known a priori. Thus, a candidate set of plans is first generated for all systems, and a desired number, k, of plans is selected, preferably using a clustering algorithm such as the known standard outlier detection algorithm of k-medoids which breaks the dataset into k groups and identifies centroids in each group. One of the selected query plans may be the default plan generated by the optimizer being tested. This k-medoids algorithm is robust to noise and more likely to preserve outliers in the dataset. The invention preferably chooses outliers as part of the sample set because it has been found that the cases in which the inaccuracy of an optimizer causes a problem almost always occur in corner cases of the cost model. That is, the accuracy of a cost model is best measured by its most significant mistakes rather than by average cases. The k-medoids clustering algorithm is an effective and robust way to choose the k input plan samples from a larger candidate set.

Figure 3:
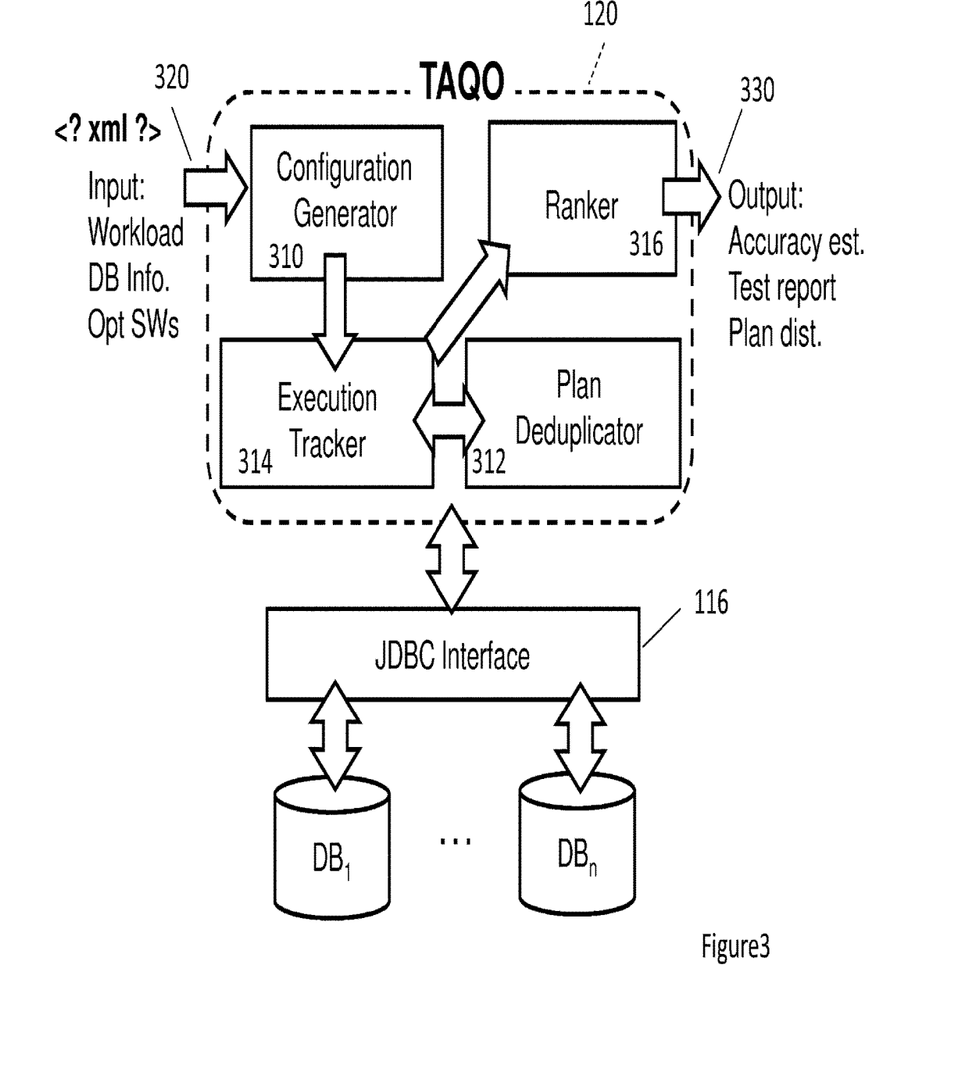
FIG. 3 is a block diagram of a query optimizer accuracy tester in accordance with the invention of the system of FIG. 1.

FIG. 3 illustrates the architecture of an embodiment of the query optimizer accuracy tester TAQO 120 of FIG. 1, and its relationship to the JDBC database interface 116. As shown, the TAQO accuracy tester components may comprise a configuration generator 310, a plan de-duplicator 312, and execution tracker 314, and a ranker 316, all of which may be implemented as executable program code that runs on CPU 110. The TAQO 120 is connected to the JDBC interface 116, as shown, and the JDBC interface may connect the TAQO to a plurality of databases $DB_1$-$DB_n$ for accuracy testing, measurement and comparison.

The configuration generator 310 may receive as an input at 320 a configuration file, an XML file, for instance, comprising a workload, database information and optional switch settings for the database optimizers. The configuration generator may determine a matrix of valid combinations of optimizer switches for a given input, and cause the optimizers to generate the multiple alternative plans as previously described.

Since different combinations of switch values might lead to the same query plan, the plan de-duplicator 312 eliminates duplicate plans from the set of query plans generated by an optimizer. The de-duplicator may be activated by registering a plan parser, which is responsible for extracting a plan's estimated cost and a plan's body from the textual output of the underlying query optimizer, and it can filter out identical plans by comparing the bodies of different plans. TAQO's framework may include pre-configured plan parsers for a number of different commercial database systems. In addition, the plan parser API may be exposed as an interface so that users can test other systems.

For a given query plan, the execution tracker 314 causes the plan to run on its associated database and times its execution until it terminates. Because the execution time of a query plan may fluctuate due, for instance, to system workload and cache factors, the execution tracker preferably runs the same query plan a pre-selected number of times, e.g., five times, and stores the best execution time, after eliminating the top plan, for instance, as representative of the query plan. Additionally, some bad plans may take a very long time to terminate. Therefore, the execution tracker may stop a plan's execution if the time exceeds a predetermined time-out value, e.g., 30 seconds, which may be specified in the input configuration file, and may so designate such plans as "timed-out plans" in an output report.

The ranker 316 is responsible for determining the correlation scores between the rankings of plans based on their actual and estimated costs, preferably using the modified Kendall Tau rank correlation metric as previously described. It may output at 330 the rank correlation accuracy estimates and a test report showing the results for each query and for each database optimizer tested. The ranker may also generate and output as part of the test report a distribution plot comparing the execution data graphically. To allow users of the accuracy tester to use different metrics and accuracy measurement techniques, the score computation API of the ranker may be exposed.

Figure 4:
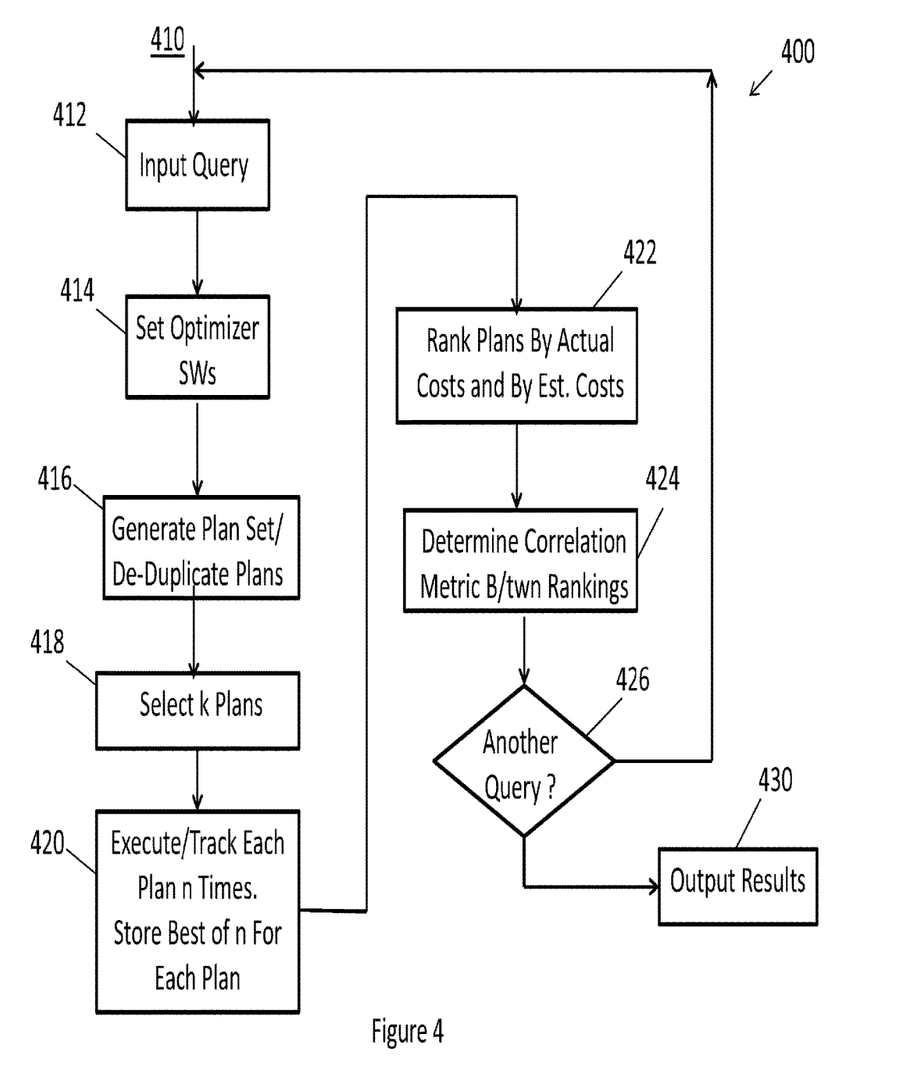
FIG. 4 is a flowchart of processing operations in accordance with an embodiment of the invention for testing the accuracy of query optimizers.

FIG. 4 is a flowchart illustrating a processing framework 400 comprising processing operations as described above of an optimizer accuracy tester in accordance with the invention. The processing operations illustrated in FIG. 4 are primarily performed by the components of the TAQO 120 illustrated in FIG. 3. They are repeated for each optimizer of the databases $DB_1$-$DB_n$ being tested.

Beginning at 410, a test query is input at 412. The query may be input as part of the configuration file and workload input at 320 to configuration generator 310 (see FIG. 3). At 414, the configuration generator 310 sets the switches of the optimizer being tested for generation of the multiple alternative query plans, as previously described. At 416, the configuration generator 310 causes the optimizer of the database being tested to generate a set of alternative query plans based upon the switch settings. The input configuration file may also include switch setting instructions to insure that the optimizer provides an appropriate range of test plans. The plan de-duplicator 312 eliminates any duplicate query plans from plans generated by the optimizer. At 418, the configuration generator selects the desired number, k, of query plans to be executed by the optimizer being tested from the plan set generated and de-duplicated at 416.

At 420, execution tracker 314 causes the optimizer being tested to execute each of the k selected query plans n number of times, and measures execution times for each. The execution tracker stores the best execution time, or some other pre-selected execution time metric, for each plan. At 422, the ranker 316 ranks each of the query plans by measuring actual cost (execution time), and ranks each plan by its estimated cost as determined by the query optimizer. At 424, the ranker then determines the rank correlation metric as previously described between the actual and estimated cost rankings. At 426, if there is another query, the process of FIG. 4 repeats for the next query and continued repeating for each additional query. At 430, the ranker generates and outputs an accuracy estimate, test report, and other results for the optimizer being tested.

The stand-alone accuracy tester of the invention is portable and extensible. Its JDBC standard interface allows it to be used with any database having a JDBC interface, and exposing the API used to compute the accuracy measure allows the user to experiment with different accuracy measurement techniques. The accuracy tester may used to compare the accuracy of optimizers of different databases by repeating the process of FIG. 4 each database optimizer under test using the same workload and testing settings. By using a common metric, the different optimizers can be objectively compared with one another and afford deeper insight into the weaknesses and strengths of different databases.

An embodiment of the invention affords a computer storage product comprising computer readable physical (non-transitory) storage medium storing the workflow framework as executable instructions for controlling the operations of a computer to perform the processing operations described herein. The computer readable medium may be any standard well known storage media, including, but not limited to magnetic media, optical media, magneto-optical media, and hardware devices configured to store and execute program code, such as application-specific integrated circuits (ASICs), programmable logic devices, and semiconductor memory such as ROM and RAM devices.

While the foregoing has been with reference to preferred embodiments of the invention, it will be appreciated by those skilled in the art that changes to these embodiments may be made without departing from the principles and spirit the invention, the scope of which is defined in the appended claims.

The invention claimed is:

1. A computer-implemented method comprising:
   obtaining, by a testing system comprising one or more computers, a plurality of query plans generated by a plurality of respective query optimizers, each query plan of the plurality of query plans being alternative query plans for computing results for a query;
   computing, for each query plan of the plurality of query plans, a respective estimated cost to compute results for the query using the query plan;
   executing each query plan of the plurality of query plans to compute a respective actual cost of executing the query plan;
   performing a clustering algorithm on the plurality of query plans using the respective estimated cost and respective actual cost to classify each query plan as belonging to a cluster or as being an outlier;
   computing, for each query optimizer from query plans generated by the optimizer, a respective rank correlation score, including:
      selecting, by the testing system, no more than N different query plans generated by the query optimizer, including selecting at least one outlier according to the clustering algorithm;
      generating, by the testing system, (i) a first ranking of query plans generated by the query optimizer, ordered according to the respective actual cost of each query plan generated by the query optimizer, and (ii) a second ranking of query plans generated by the query optimizer, ordered according to the respective estimated cost of each query plan generated by the query optimizer;
      computing, by the testing system based at least on the first ranking of the different query plans and the second ranking of the different query plans, a first rank correlation score indicative of an accuracy of the query optimizer in estimating costs associated with executing query plans, wherein determining the first rank correlation score comprises performing a pair-wise comparison of each pair of plans that were incorrectly ranked in the second ranking, including iteratively:

computing a weight of each particular plan, the weight representing a comparison of an actual cost of a highest-ranked plan to an actual cost for the particular plan, weighting a distance between each pair of incorrectly ranked plans according to a first weight for a first plan and a second weight for a second plan, and adding the weighted distance for the pair of plans to the first rank correlation score for the query optimizer;

ranking the plurality of query optimizers according to the respective rank correlation score computed for each of the plurality of query optimizers; and improving performance of a database system, including selecting, by the testing system, as a preferred query optimizer for generating query plans for the database system, a highest-ranked query optimizer according to the ranking of the plurality of query optimizers.

2. The method of claim 1, wherein the first rank correlation score for each query optimizer represents a likelihood of the query optimizer making wrong optimization decisions.

3. The method of claim 2, wherein computing the rank correlation score comprises penalizing ranking errors of good query plans more severely than ranking errors of bad query plans.

4. The method of claim 2, wherein the weight of each particular plan is inversely relative to the actual cost of the plan.

5. The method of claim 1, further comprising removing duplicate query plans before computing respective rank correlation scores.

6. The method of claim 5, wherein computing a rank correlation score for each query optimizer comprises determining the rank correlation score for a first query optimizer and a second query optimizer over a same predetermined number of selected query plans.

7. The method of claim 6, wherein the clustering algorithm is a k-medoids clustering algorithm.

8. A non-transitory computer-readable medium storing instructions that, when executed by one or more computers, cause the one or more computers to perform operations comprising:

obtaining a plurality of query plans generated by a plurality of respective query optimizers, each query plan of the plurality of query plans being alternative query plans for computing results for a query;

computing, for each query plan of the plurality of query plans, a respective estimated cost to compute result for the query using the query plan;

executing each query plan of the plurality of query plans to compute a respective actual cost of executing the query plan;

performing a clustering algorithm on the plurality of query plans using the respective estimated cost and respective actual cost to classify each query plan as belonging to a cluster or as being an outlier;

computing, for each query optimizer from query plans generated by the optimizer, a respective rank correlation score, including:

selecting no more than N different query plans generated by the query optimizer, including selecting at least one outlier according to the cluster algorithm;

generating (i) a first ranking of query plans generated by the query optimizer, ordered according to the respective actual cost of each query plan generated by the query optimizer, and (ii) a second ranking of query plans generated by the query optimizer, ordered according to the respective estimated cost of each query plan generated by the query optimizer;

computing, based at least on the first ranking of the different query plans and the second ranking of the different query plans, a first rank correlation score indicative of an accuracy of the query optimizer in estimating costs associated with executing query plans, wherein determining the first rank correlation score comprises performing a pair-wise comparison of each pair of plans that were incorrectly ranked in the second ranking, including iteratively:

computing a weight of each particular plan, the weight representing a comparison of an actual cost of a highest-ranked plan to an actual cost for the particular plan, weighting a distance between each pair of incorrectly ranked plans according to a first weight for a first plan and a second weight for a second plan, and adding the weighted distance for the pair of plans to the first rank correlation score for the query optimizer;

ranking the plurality of query optimizers according to the respective rank correlation score computed for each of the plurality of query optimizers; and improving performance of a database system, including selecting, as a preferred query optimizer for generating query plans for the database system, a highest-ranked query optimizer according to the ranking of the plurality of query optimizers.

9. The non-transitory computer-readable medium of claim 8, wherein the first rank correlation score for each query optimizer represents a likelihood of the first query optimizer making wrong optimization decisions.

10. The non-transitory computer-readable medium of claim 9, wherein the weight of each particular plan is inversely relative to the actual cost of the plan.

11. The non-transitory computer-readable medium of claim 8, further comprising removing duplicate query plans before computing respective rank correlation scores.

12. The non-transitory computer-readable medium of claim 8, wherein computing a rank correlation score for each query optimizer comprises determining the rank correlation score for a first query optimizer and a second query optimizer over a same predetermined number of selected query plans.

13. The non-transitory computer-readable medium of claim 12, wherein the clustering algorithm is a k-medoids clustering algorithm.

14. The non-transitory computer-readable medium of claim 8, wherein the operations are repeated for each of a plurality of query optimizers to produce a normalized rank correlation metric for each query optimizer that indicates a respective accuracy of each query optimizer, and the operations further comprising generating a report that compares the accuracies of the query optimizers.

15. A system comprising:

one or more computer processors; and a non-transitory computer-readable medium storing instructions that, when executed by the one or more computer processors, cause the one or more computer processors to perform operations comprising:

obtaining a plurality of query plans generated by a plurality of respective first query optimizers, each query plan of the plurality of query plans being alternative query plans for has generated as alternatives for executing computing results for a query;

computing, for each query plan of the plurality of query plans, a respective estimated cost to compute results for the query using the query plan;

executing each query plan of the plurality of query plans to compute a respective actual cost of executing the query plan;

performing a clustering algorithm on the plurality of query plans using the respective estimated cost and respective actual cost to classify each query plan as belong to a cluster or as being an outlier;

computing, for each query optimizer from query plans generated by the optimizer, a respective rank correlation score, including:

selecting no more than N different query plans generated by the query optimizer, including selecting at least one outlier according to the clustering algorithm;

generating (i) a first ranking of query plans generated by the query optimizers, ordered according to the respective actual cost of each query plan generated by the query optimizer, and (ii) a second ranking of query plans generated by the query optimizer, ordered according to the respective estimated cost of each query plan generated by the query optimizer;

computing, based at least on the first ranking of the different query plans and the second ranking of the different query plans, a first rank correlation score indicative of an accuracy of the query optimizer in estimating costs associated with executing query plans, wherein determining the first rank correlation score comprises performing a pair-wise comparison of each pair of plans that were incorrectly ranked in the second ranking, including iteratively:

computing a weight of each particular plan, the weight representing a comparison of an actual cost of a highest-ranked plan to an actual cost for the particular plan, weighting a distance between each pair of incorrectly ranked plans according to a first weight for a first plan and a second weight for a second plan, and adding the weighted distance for the pair of plans to the first rank correlation score for the query optimizer;

ranking the plurality of query optimizers according to the respective rank correlation score computed for each of the plurality of query optimizers; and improving performance of a database system, including selecting, as a preferred query optimizer for generating query plans for the database system, a highest-ranked query optimizer according to the ranking of the plurality of query optimizers.

16. The system of claim 15, wherein the first rank correlation score for each query optimizer represents a likelihood of the query optimizer making wrong optimization decisions.

17. The system of claim 16, wherein the weight of each particular plan is inversely relative to the actual cost of the plan.

18. The system of claim 15, wherein the operations further comprising removing duplicate query plans before computing respective rank correlation scores.

19. The system of claim 15, wherein computing a rank correlation score for each query optimizer comprises determining the rank correlation score for a first query optimizer and a second query optimizer over a same predetermined number of query plans.

20. The system of claim 15, the operations further comprising connecting the system to a plurality of different databases, each having a query optimizer, the system being operable to produce a normalized rank correlation metric for each query optimizer that indicates a respective accuracy of each query optimizer, for comparing the query optimizers of the databases to each other.

* * * * *

UNITED STATES PATENT AND TRADEMARK OFFICE
CERTIFICATE OF CORRECTION

PATENT NO. : 10,140,336 B1
APPLICATION NO. : 15/041850
DATED : November 27, 2018
INVENTOR(S) : Zhongxian Gu, Mohamed F. Soliman and Florian Michael Waas It is certified that error appears in the above-identified patent and that said Letters Patent is hereby corrected as shown below:

In the Claims

Column 8, Line 33, in Claim 9: after "the" delete "first".

Column 8, Line 64, in Claim 15: after "respective" delete "first".

Column 8, Lines 66-67, in Claim 15: after "for" delete "has generated as alternatives for executing".

Signed and Sealed this
Twenty-ninth Day of January, 2019

Andrei Iancu
*Director of the United States Patent and Trademark Office*